(12) United States Patent
Raymond

(10) Patent No.: US 7,377,105 B1
(45) Date of Patent: May 27, 2008

(54) DUAL PUMP ASSEMBLY

(75) Inventor: Hauser Raymond, Sullivan, IL (US)

(73) Assignee: Hydro-Gear Limited Partnership

( * ) Notice: Subject to any disclaimer, the term of this patent is extended or adjusted under 35 U.S.C. 154(b) by 616 days.

(21) Appl. No.: 10/987,681

(22) Filed: Nov. 12, 2004

(51) Int. Cl.
F16D 31/02 (2006.01)
F04B 23/04 (2006.01)

(52) U.S. Cl. .......................... 60/486; 60/484
(58) Field of Classification Search .......... 60/484, 60/485, 486; 74/11; 92/12.2
See application file for complete search history.

(56) References Cited

U.S. PATENT DOCUMENTS

| | | | |
|---|---|---|---|
| 1,539,616 A | 5/1925 | Williams | |
| 2,875,701 A | 3/1959 | Ebert | |
| 2,914,219 A | 11/1959 | Chiantelassa | |
| 3,279,172 A * | 10/1966 | Kudo et al. | 60/484 |
| 3,922,931 A | 12/1975 | Osujyo et al. | |
| 4,252,508 A | 2/1981 | Forster | |
| 4,270,408 A | 6/1981 | Wagner | |
| 4,327,603 A * | 5/1982 | Zaunberger et al. | 475/22 |
| 4,534,271 A | 8/1985 | Forster | |
| 4,819,508 A | 4/1989 | Yamaoka et al. | |
| 4,893,524 A | 1/1990 | Ohashi et al. | |
| 4,971,535 A | 11/1990 | Okada et al. | |
| 5,040,429 A | 8/1991 | Del Castillo | |
| 5,078,222 A | 1/1992 | Hauser et al. | |
| 5,207,060 A | 5/1993 | Sheets | |
| 5,247,794 A | 9/1993 | Benson et al. | |
| 5,304,043 A | 4/1994 | Shilling | |
| 5,354,180 A | 10/1994 | Forster | |
| 5,501,578 A | 3/1996 | Skirde | |
| 5,542,307 A | 8/1996 | Hasegawa et al. | |
| 5,800,134 A | 9/1998 | Hasegawa et al. | |
| 6,022,198 A | 2/2000 | Hoffmeister | |
| 6,199,380 B1 | 3/2001 | Ishii | |
| 6,301,885 B1 | 10/2001 | Johnson et al. | |
| 6,332,393 B1 | 12/2001 | Trimble | |
| 6,361,282 B1 | 3/2002 | Wanschura | |
| 6,363,815 B1 | 4/2002 | Ishimaru et al. | |
| 6,382,339 B1 | 5/2002 | Nemoto | |
| 6,425,244 B1 | 7/2002 | Ohashi et al. | |
| 6,474,218 B2 | 11/2002 | Saito et al. | |

(Continued)

FOREIGN PATENT DOCUMENTS

EP 1 473 183 A2 3/2004

(Continued)

OTHER PUBLICATIONS

Dixie Chopper, Operation Manual 1998, Cover Page and pp. 50-51, 60-61, 66, Revision #5 Feb. 1998.

Primary Examiner—Michael Leslie
(74) Attorney, Agent, or Firm—Neal, Gerber & Eisenberg LLP

(57) ABSTRACT

A dual pump apparatus for use on a vehicle or industrial application having a housing in which a pair of hydraulic pumps are mounted and driven by a prime mover. The prime mover is drivingly coupled to a main input shaft, which drives the hydraulic pumps. An auxiliary pump may be drivingly coupled to the main drive shaft and a power take off unit may also be connected thereto. The power take off unit may be driven by a power take off unit output drive shaft, on which a cooling fan may be attached.

27 Claims, 12 Drawing Sheets

U.S. PATENT DOCUMENTS

| | | |
|---|---|---|
| 6,487,856 B1 | 12/2002 | Ohashi et al. |
| 6,494,686 B1 | 12/2002 | Ward |
| 6,672,058 B1 | 1/2004 | Langenfeld et al. |
| 6,672,843 B1 | 1/2004 | Holder et al. |
| 6,705,840 B1 | 3/2004 | Hauser et al. |
| 6,736,605 B2 | 5/2004 | Ohashi et al. |
| 6,877,302 B2 | 4/2005 | Samejima et al. |
| 6,953,327 B1 * | 10/2005 | Hauser et al. ............ 60/486 |
| 2003/0188909 A1 | 10/2003 | Ohashi et al. |
| 2004/0200657 A1 | 10/2004 | Stoll et al. |
| 2004/0221573 A1 | 11/2004 | Ohashi et al. |
| 2004/0237490 A1 | 12/2004 | Yasuda et al. |
| 2005/0016304 A1 | 1/2005 | Ishii et al. |

FOREIGN PATENT DOCUMENTS

| | | |
|---|---|---|
| JP | 2000009023 A | 1/2000 |
| JP | 2001-146951 | 5/2001 |
| JP | 2001-263259 | 9/2001 |
| WO | WO99/67532 | 12/1999 |

* cited by examiner

DUAL PUMP ASSEMBLY

BACKGROUND OF THE INVENTION

This application relates in general to hydrostatic pumps and transmissions and in particular to a dual pump arrangement. Hydrostatic pumps are well-known for use in driving vehicles such as tractors and other off-road devices. Such pumps are also used in a wide variety of industrial applications other than vehicles.

In one known arrangement for a vehicle, a plurality of pumps is mounted in separate housings on a vehicle frame. Each pump is connected to a respective hydrostatic motor through high pressure hoses, which are often connected to the pump through an end cap. The end cap is secured to the pump housing and includes a running surface for the pump cylinder block and porting to connect the cylinder block to the hoses.

A control arm is engaged to each hydrostatic pump to control the output of the pump. In a known design, the hydrostatic pump is of an axial piston design and the control arm is engaged to a swash plate, the rotation of which can change the output of the pump from forward to neutral to reverse. Rotation of the pumps is provided by rotary input shafts which are separately driven by the vehicle engine by pulleys and belts or other known methods. The pump transmits hydraulic fluid through one of a pair of high pressure hoses to a hydrostatic motor. Rotational output of the motor is then transmitted to the vehicle drive wheels through an output axle or other known means.

Such an arrangement allows for zero turn capability, since the hydrostatic pumps may be operated independently of one another. However, there is a cost involved with this arrangement, as it requires at least four separate housings for the individual pumps and motors, and each housing must be individually secured to the vehicle frame.

A BDU transmission, which is a hydrostatic transmission ("HST") that is currently known in the industry, comprises a single housing enclosing both a hydrostatic pump and a hydrostatic motor, both of which are mounted to a single plate. The pump input shaft and motor output shaft are parallel to one another, and the plate contains hydraulic porting to connect the pump and motor. One such hydrostatic transmission is shown in U.S. Pat. No. 5,392,670. Such an HST is generally used to connect to a drive train for powering output axles of a tractor or similar vehicle.

SUMMARY OF THE INVENTION

A dual pump apparatus for use on a vehicle or industrial application having a housing in which a pair of hydraulic pumps are mounted and driven by a prime mover is provided. The prime mover is drivingly coupled to a main input shaft, which drives the hydraulic pumps. An auxiliary pump may be drivingly coupled to the main drive shaft and a power take off unit may also be connected thereto. The power take off unit may be driven by a power take off unit output drive shaft, on which a cooling fan may be attached.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The following is a description of the multiple embodiments of this invention. Where appropriate, like numerals indicate identical or substantially identical components, and similar numerals with a different initial numeral indicate similar components with certain differences as specified. Further, in each of the embodiments discussed herein, identical numerals followed by "a" and "b" identify elements that are either identical or are mirror images of each other. Therefore, for convenience, the descriptions of elements with numerals followed by "a" apply equally to elements with identical numerals followed by "b."

Figure 1:
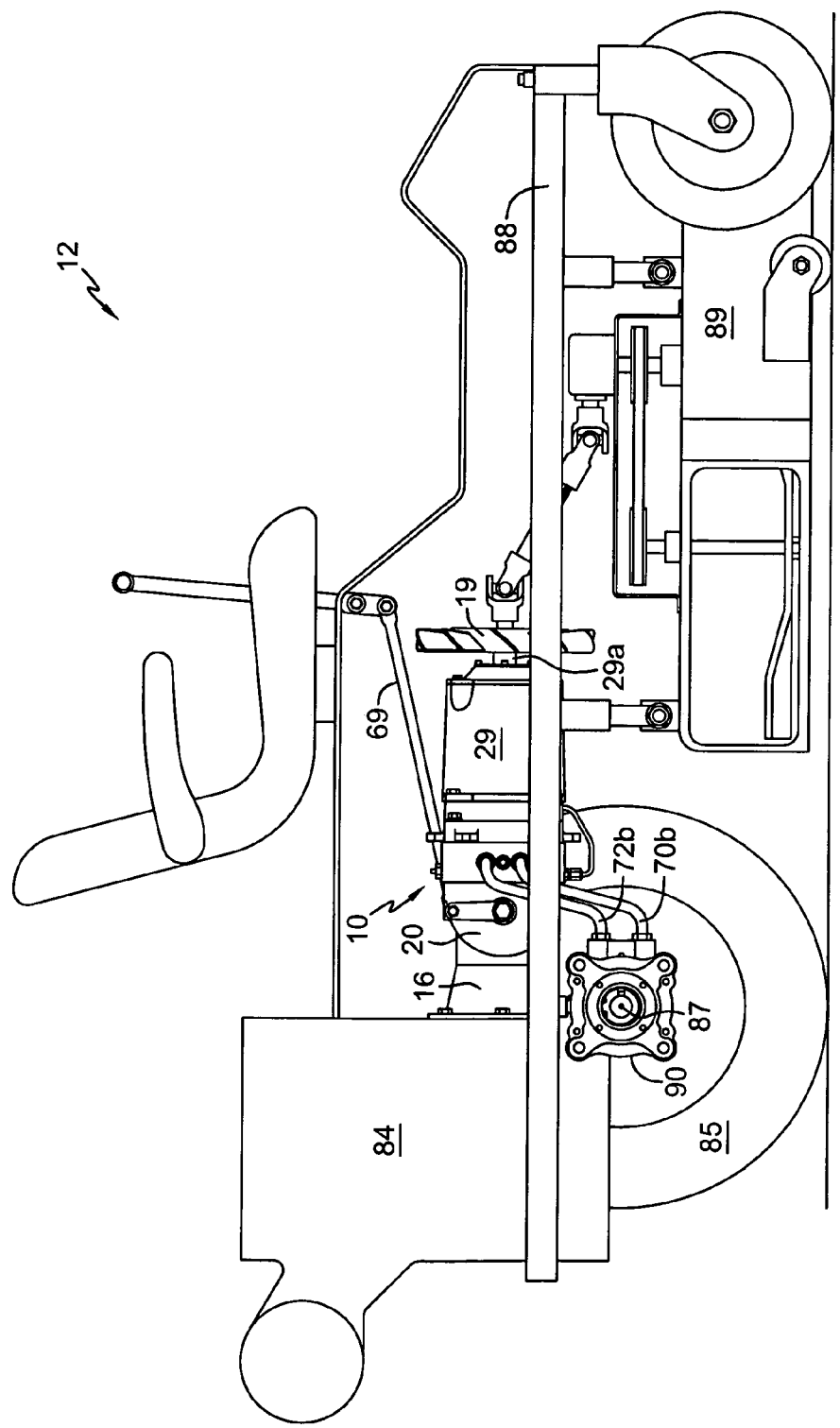
FIG. 1 depicts a vehicle employing a first embodiment of the drive assembly of the present invention with one drive wheel removed for clarity.
Figure 4:
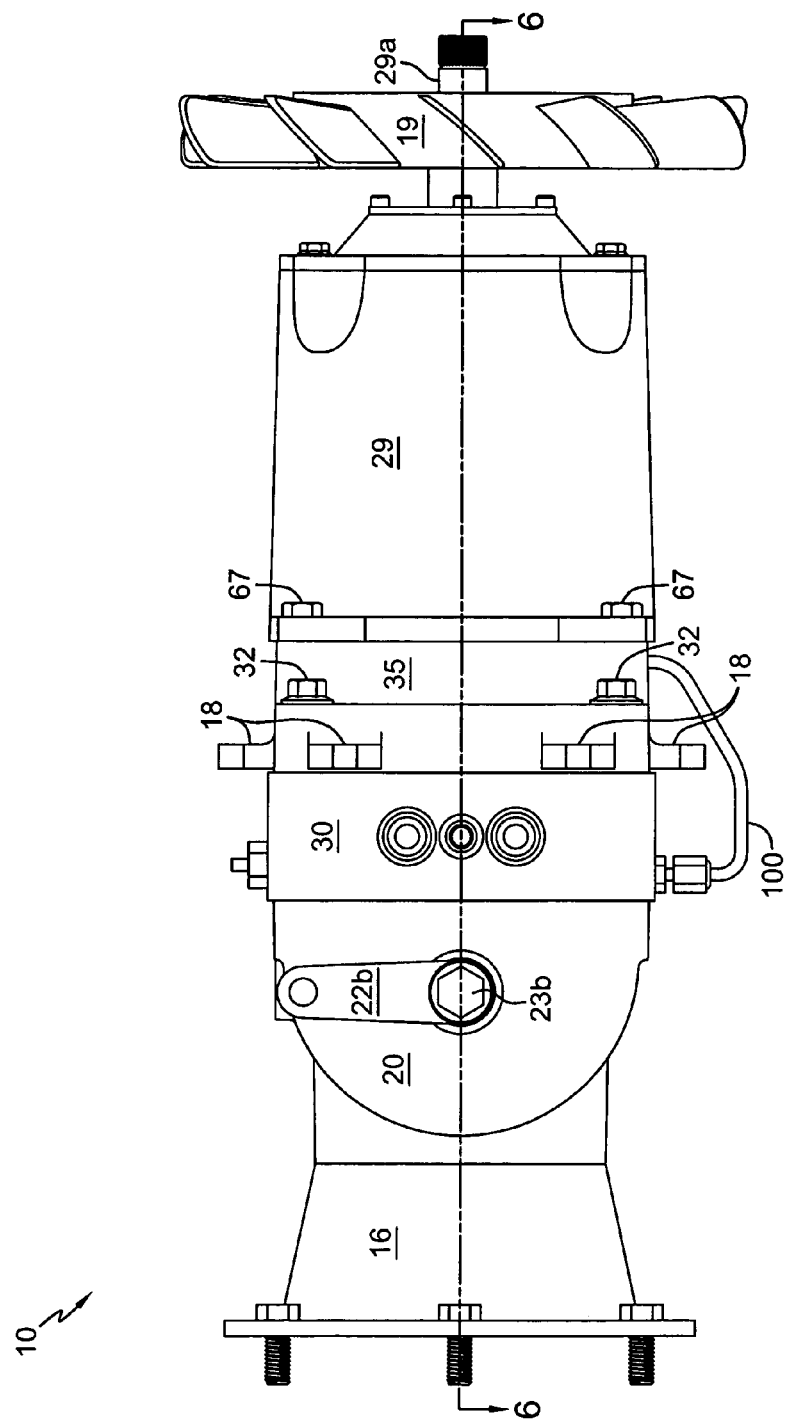
FIG. 4 is a side view of the external casing of a first embodiment of this invention.
Figure 5:
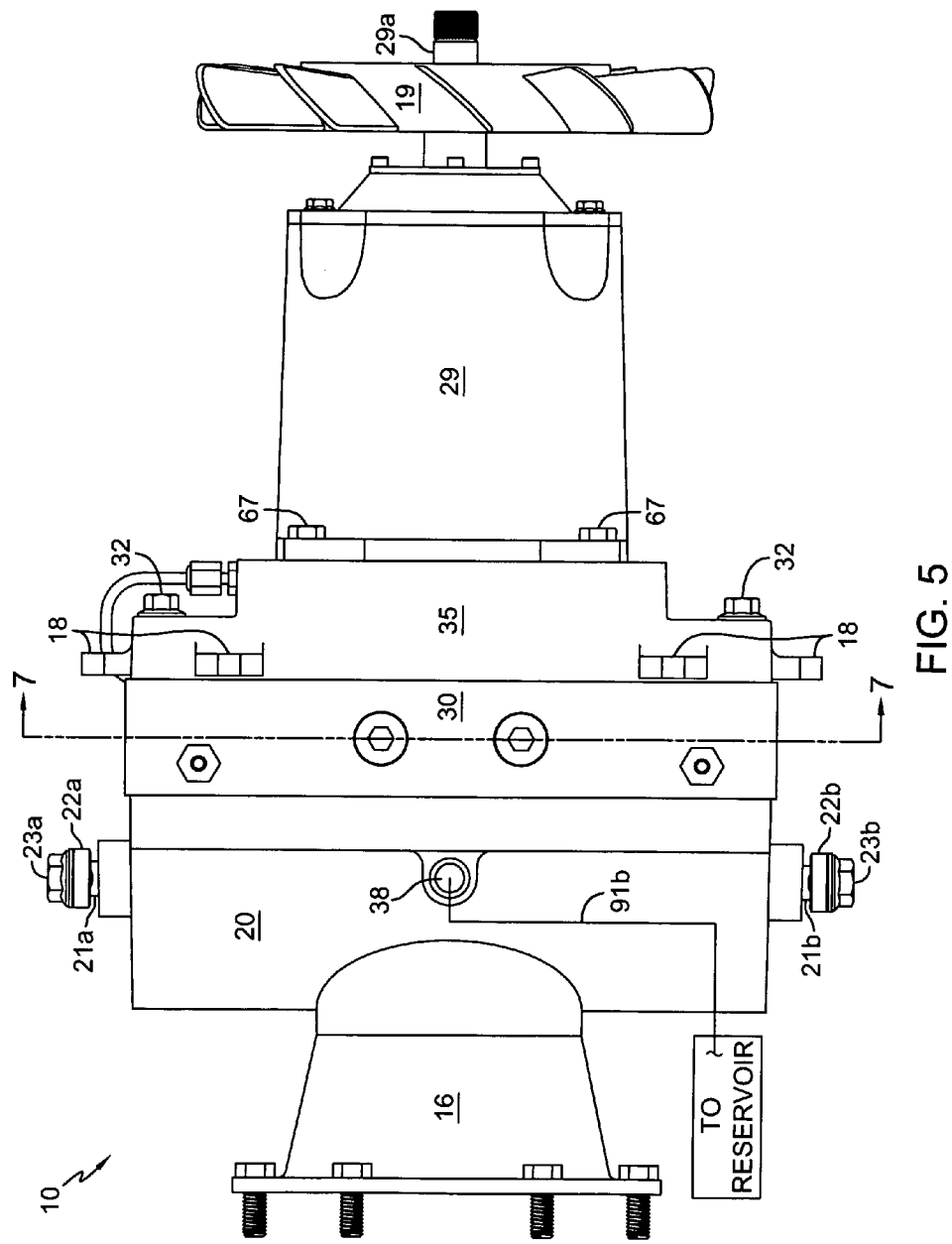
FIG. 5 is a top view of the dual pump design shown in FIG. 4.
Figure 6:
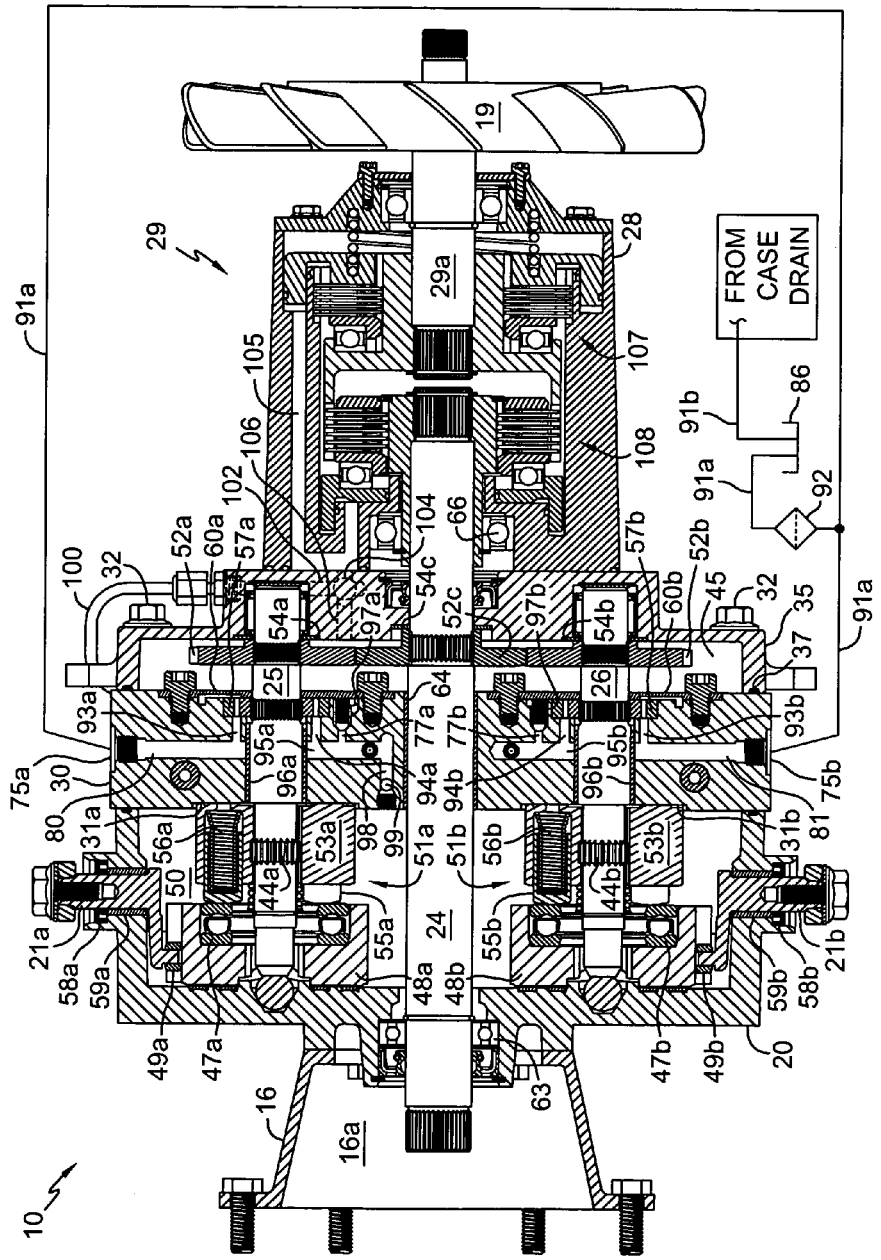
FIG. 6 is a cross-sectional view of the internal components of the dual pump arrangement shown in FIG. 4, along the lines 6-6 in FIG. 4, with certain parts shown as solid, and certain system elements shown schematically.
Figure 7:
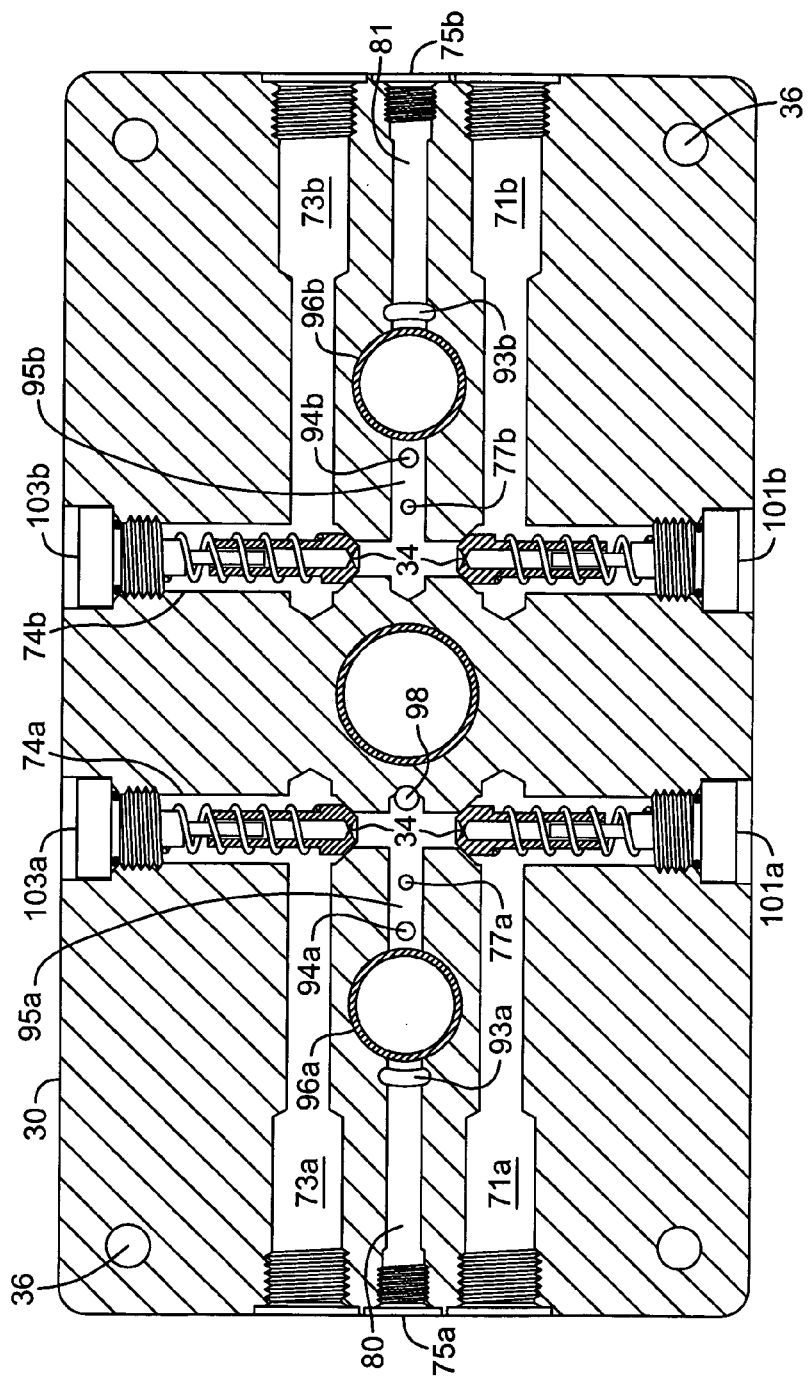
FIG. 7 is a cross-sectional view of the end cap of a first embodiment, along the lines 7-7 in FIG. 5.

A vehicle 12 employing a first embodiment of a dual pump unit 10 is shown in FIG. 1, while the external structure thereof is shown in FIGS. 4 and 5. The internal structure of dual pump unit 10 is shown in FIG. 6. While the hydraulic porting of end cap 30 is shown in FIG. 7, it will be understood that the drawings are not to scale, and the arrangement and sizing of the components will be obvious to a person of skill in the art. The size of pumps 51a and 51b and the other components will be dictated primarily by the intended applications of the unit and any required external dimensions.

FIG. 1 depicts a vehicle 12 incorporating a first embodiment of the present invention. The arrangement shown here is of a rear engine mounting, where engine 84 is mounted on vehicle frame 88, which also supports motors 90, mower deck 89 and other possible attachments. Axles 87 extend from motors 90 and drive vehicle wheels 85.

Pump housing 20 is mounted by way of bell housing 16 to engine 84 so that pump housing 20 is generally parallel to vehicle frame 88 and end cap 30 is perpendicular to vehicle frame 88. Attach points 18 formed on gear chamber cover 35 may also be used to secure pump apparatus 10 to frame 88 in a number of known manners. Hydraulic hoses 70b and 72b carry fluid from threaded system ports 71 and 73 to respective motors 90. Pump apparatus 10 is preferably located along the center line of the vehicle, i.e., along the center of the longitudinal axis of the vehicle parallel to and between members of frame 88. This location of pump apparatus 10 simplifies the arrangement and connections of the various hoses, linkage mechanisms and the like. One such advantage is that hoses 70 and 72 may be generally symmetrical in length and routing. This length symmetry includes having hoses 70 of one generally identical length and hoses 72 of a second generally identical length, or having hoses 70 and 72 being of one generally identical length. Note that while the aforementioned discussion relates to the preferable positioning of pump unit 10 on the vehicle center line, pump unit 10 may be positioned in other locations as need dictates.

Figure 2:
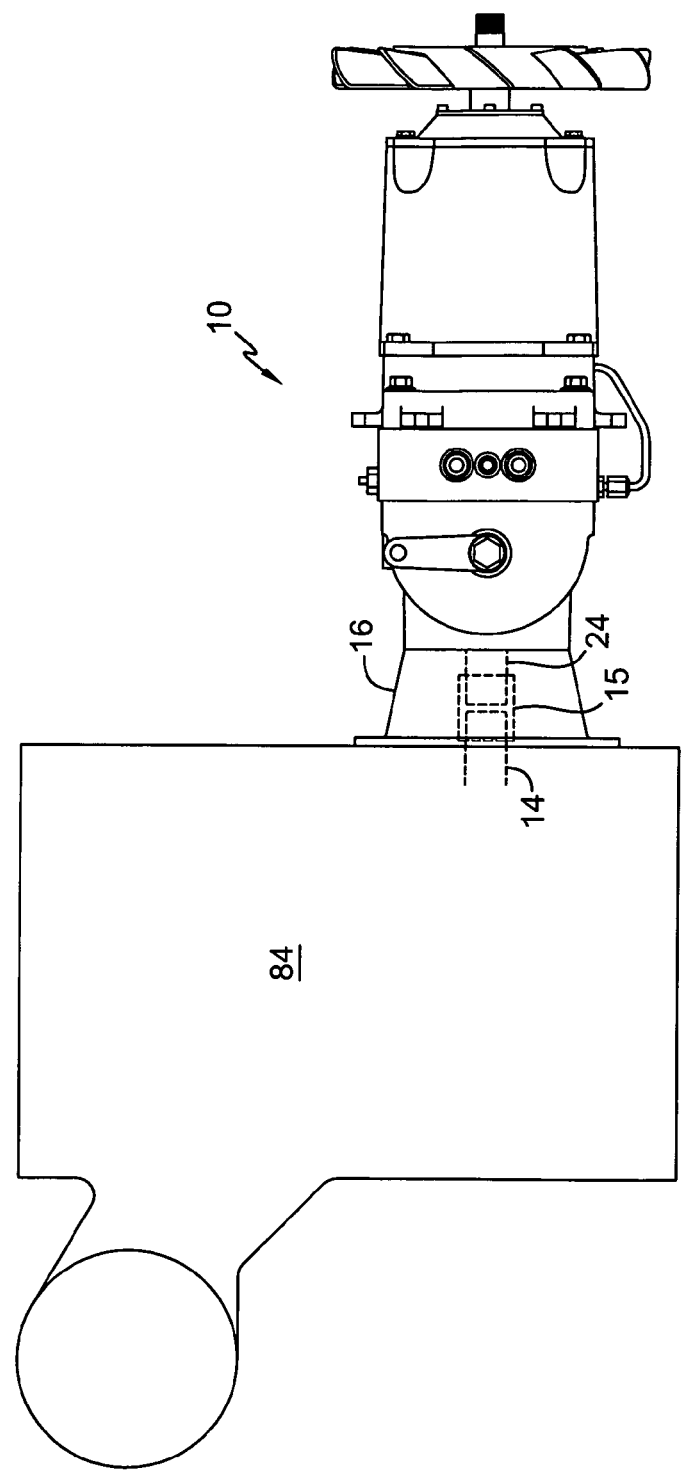
FIG. 2 is a side view of a first embodiment of this invention with certain internal elements shown in phantom to show one type of connection to the prime mover.
Figure 3:
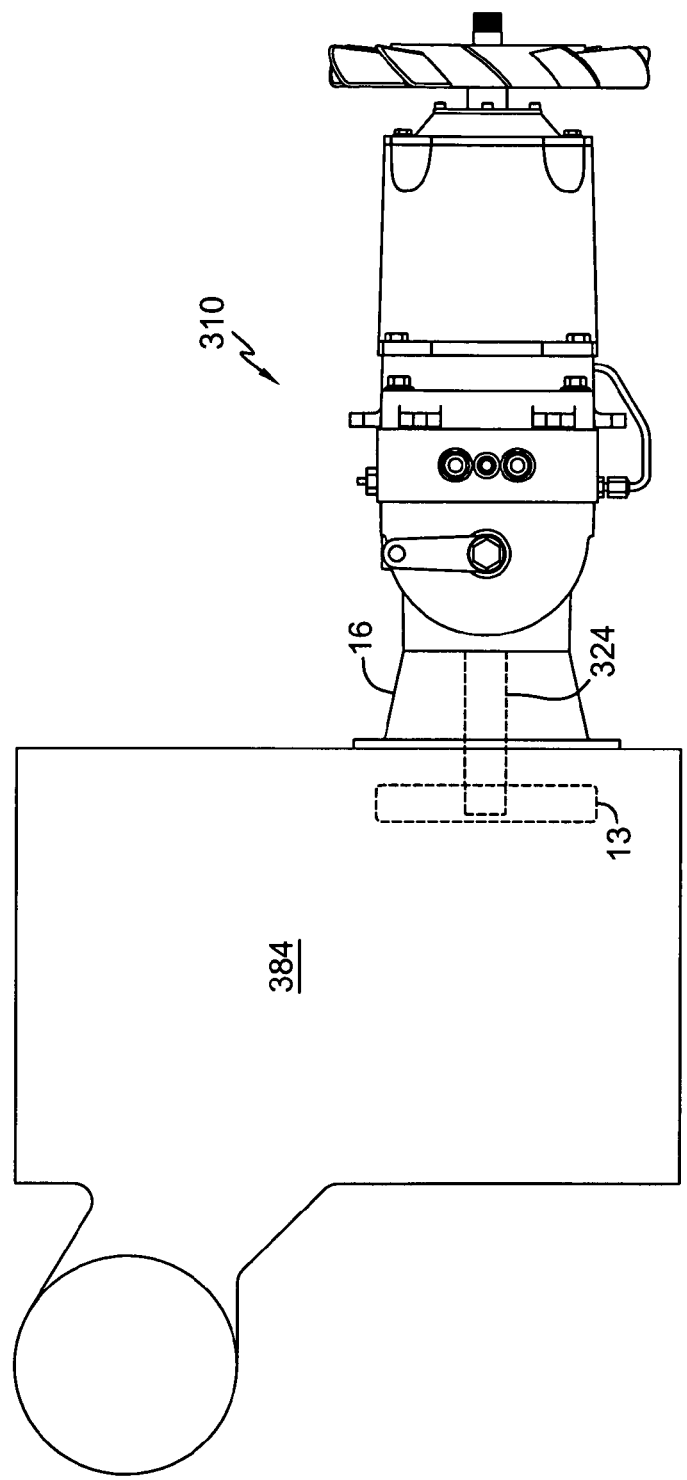
FIG. 3 is a side view of a first embodiment of this invention with certain internal elements shown in phantom to show another type of connection to the prime mover.

Bell housing 16 is positioned between and secured to both pump unit 10 and engine 84. In addition, as shown in FIG. 6, bell housing 16 forms an enclosed space 16a covering the coupling between main drive shaft 24 and engine 84. There are a variety of configurations for connecting main drive shaft 24 to a prime mover 84 output. One such configuration is depicted in FIG. 2, where an engine output shaft 14 is connected to a coaxially positioned main input shaft 24 by coupler 15. Another possible configuration is depicted in FIG. 3, where main input shaft 324 of pump apparatus 310 is connected to flywheel 13 of prime mover 384.

Inside housing 20 is located a pump chamber (or cavity) 50 in which are mounted a first rotatable pump 51a and a second pump 51b, both of which are rotatably mounted on their respective running surfaces 31a and 31b on end cap 30. End cap 30 is secured to housing 20 by fasteners 32, which also secure gear chamber cover 35 to end cap 30 and which extend through openings 36 in end cap 30 into threaded openings (not shown) in housing 20. End cap 30 acts to close off pump chamber 50.

The following discussion of pump 51a will also apply to second pump 51b. Pump 51a is of the axial piston design and comprises rotatable cylinder block 53a, in which are mounted a plurality of axial stick pistons 55a, each of which includes a piston spring 56a therein, with cylinder block 53a engaged to first pump shaft 25 by means of spline 44a or similar means. Pistons 55a abut a thrust bearing 47a mounted in swash plate 48a. Trunnion arm 21a interfaces with swashplate 48a through slider bearing 49a. Rotation of trunnion arm 21a thus moves swash plate 48a and will control the direction and flow rate of the output of hydraulic pump 51a. End cap 30 is preferably made of aluminum; it should be understood that materials such as cast iron may also be used and a valve plate may be used in conjunction with either material.

Figure 8:
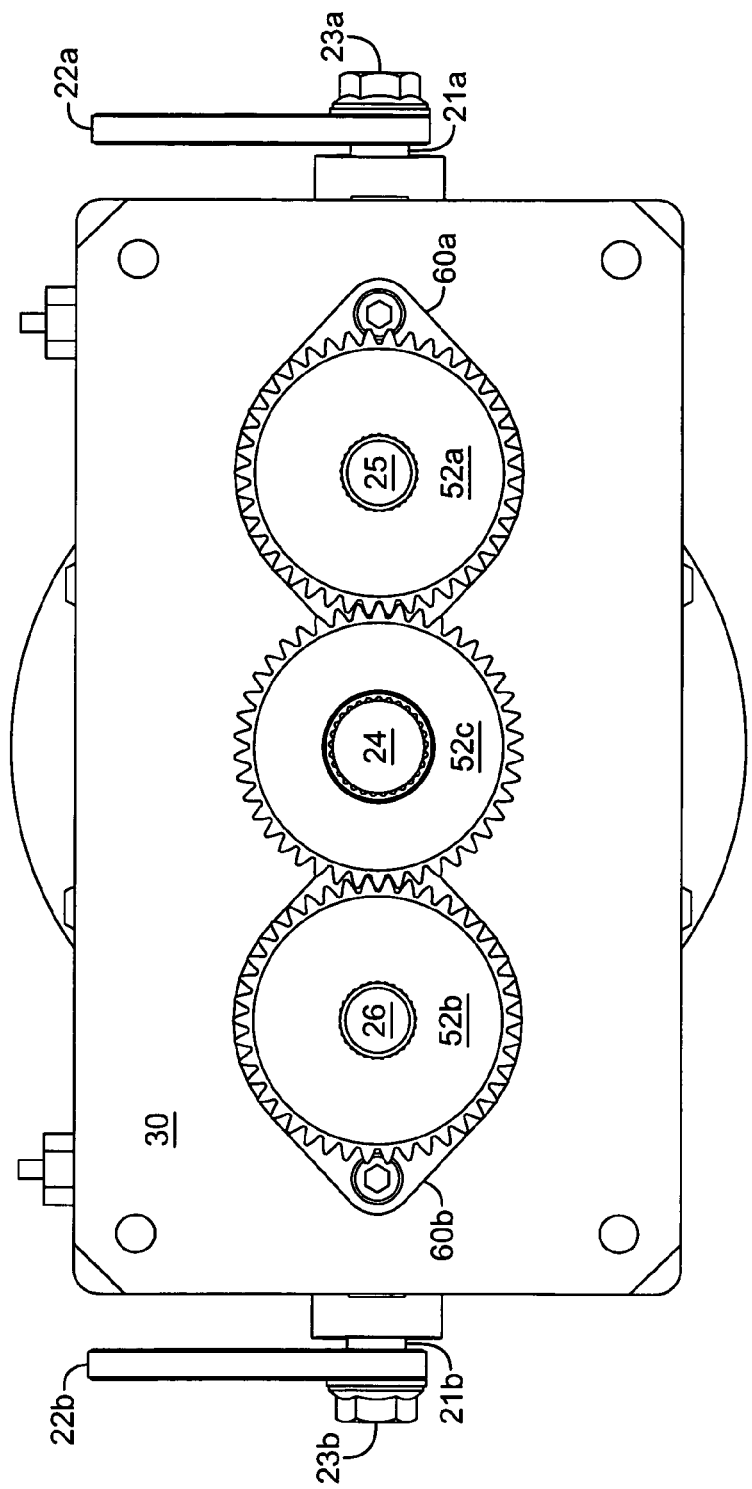
FIG. 8 is an end view of the dual pump design shown in FIG. 5 with the PTO and gear chamber cover removed.

Trunnion arm 21a extends out from housing 20 through seal 58a and bushing 59a. As shown in FIG. 8, control arms 22a and 22b are mounted to trunnion arms 21a and 21b with fasteners 23a and 23b. Control arms 22a and 22b can be engaged to various linkage mechanisms so that pumps 51a and 51b can be independently controlled by a vehicle operator. The location of trunnion arms 21a and 21b on opposite ends of housing 20 (corresponding to the sides of vehicle frame 88) permits the use of more efficient linkage systems 69.

Main drive shaft 24 is directly engaged to an engine or prime mover 84 on one end and drivingly engaged to pump shafts 25 and 26, as discussed in more detail below and as shown most clearly in FIGS. 1, 2 and 6. For drivingly coupling main drive shaft 24 to pump shafts 25 and 26, a plurality of gear sets may be employed, which will be discussed in greater detail below. In this embodiment, the output of engine 84 is horizontal with respect to the ground, as are main drive shaft 24 and pump shafts 25 and 26.

Drive shaft 24 may also extend outside gear chamber cover 35 and drive a power take off unit ("PTO") 29. PTO 29 may assume an engaged and disengaged position. In the engaged position, PTO shaft 29a will be coupled to drive shaft 24 and may be used to power an output device, such as a mower deck. In the disengaged position, PTO shaft 29a and drive shaft 24 will not be in driving communication with one another. PTO shaft 29a extends outside PTO 29 and, as shown in, e.g., FIGS. 1 through 6, a cooling fan 19 may be mounted on PTO shaft 29a. Therefore, when PTO 29 is engaged and drive shaft 24 is coupled to PTO shaft 29a drive shaft 24 will supply the driving force for PTO 29 and fan 19. It should be noted that PTO 29 and the corresponding extension of main drive shaft 24 through gear chamber cover 35 is optional; shaft 24 need not extend out in such a manner, in which case gear chamber cover 35 would be a solid structure on the end thereof.

PTOs are known in the art, so only minimal explanation of the function of PTO 29 will be provided herein. PTO 29 is attached to end cap 30 by a plurality of fasteners 67. Since PTO 29 as depicted is hydraulically controlled a source of hydraulic fluid is required. In the embodiment shown in FIGS. 6 and 7, charge fluid from passage 94a is directed to charge gallery 95a and then through passage 98 to passage 99, to which is connected hydraulic line 100, shown in FIGS. 4 and 6. Line 100 is connected to passage 102 in gear chamber cover 35. Valve 104, which is operator controlled by one of a variety of known techniques, is used to activate and deactivate PTO 29. Valve 104 either provides pressurized fluid from passage 102 to PTO gallery 105, or it blocks fluid from passage 102 from entering into gallery 105 while relieving pressure from gallery 105. The fluid relieved from gallery 105 travels through passage 106, which is either connected to gear chamber 45 or pump chamber 50 by an internal or external connection.

When valve 104 is operated to provide pressurized fluid from passage 102 to gallery 105, PTO brake 107, which normally clamps PTO shaft 29a to PTO housing 28, is deactivated, thereby leaving PTO shaft 29a free to rotate. As PTO brake 107 is being deactivated, PTO clutch 108 is being activated, connecting main drive shaft 24 to PTO shaft 29a, thus causing PTO shaft 29a to rotate with shaft 24. When valve 104 is returned to a deactivated position pressure is released from gallery 105, allowing clutch 108 to be deactivated and brake 107 to be activated, uncoupling PTO shaft 29a from shaft 24 and braking PTO shaft 29a.

As shown in FIGS. 6 and 8, spur gears 52a, 52b and 52c, which are preferably helical spur gears, are mounted in gear chamber 45, which may be sealed from pump chamber 50. Spur gear 52c is mounted on main drive shaft 24 and is directly engaged to spur gears 52a and 52b, which are mounted on shaft 25 and shaft 26, respectively. Gears 52a, 52b, and 52c are positioned by shoulders formed on their respective shafts and by proximity to washers 54a, 54b and 54c, which are located adjacent gear chamber cover 35. Shafts 25 and 26 in turn drive first and second pumps 51a and 51b, respectively.

Gear chamber 45 is formed by end cap 30 and gear chamber cover 35, which is secured to housing 20 through end cap 30 by a plurality of fasteners 32, as previously noted. A sealant, gasket, or o-ring 37 may be used at this junction to prevent leakage of hydraulic oil or gear grease. Main drive shaft 24 may be supported and located in a variety of locations, such as PTO 29 by sealed bearing 66, housing 20 by bearing 63, end cap 30 by bearing 64, or in gear chamber cover 35. Cooling fan 19 is secured to main drive shaft 24 by a spline and retaining ring (not shown) or may be secured by a number of other known configurations. An optional oil cooler (not shown) could also be added to the system and located to take advantage of the air flow from cooling fan 19. A seal may be positioned adjacent main drive shaft 24 between pump chamber 50 and gear chamber 45 so that different lubricants may be used in each chamber, such as oil in pump chamber 50 and grease in gear chamber 45.

As shown most clearly in FIG. 6, charge pumps 57*a* and 57*b*, which are gerotor style charge pumps, are mounted in end cap 30 and splined to pump shafts 25, 26. Charge pumps 57*a* and 57*b* may be secured in end cap 30 by charge covers 60*a* and 60*b*. Kidney 93*a* provides oil from passage 80 to charge pump 57*a*. As shown in FIGS. 6 and 7, pressurized oil is sent from charge pump 57*a* to charge gallery 95*a* through passage 94*a*. Charge relief opening 77*a* is also formed in charge gallery 95*a* to permit oil to be discharged therethrough by means of charge relief valve 97*a* in the event of excess oil pressure.

The hydraulic porting in end cap 30 is shown in FIG. 7. System ports 71 and 73 extend into end cap 30, with ports 71*a* and 73*a* in communication with first pump 51*a* and ports 71*b* and 73*b* in communication with second pump 51*b*. A set of check valves 101*a*, 101*b*, 103*a* and 103*b* is threaded into respective openings 74*a* and 74*b* in end cap 30, corresponding to ports 71*a*, 71*b*, 73*a* and 73*b*. Check valves 101*a*, 101*b*, 103*a* and 103*b* are of a standard design known in the art, and each may include a bleed 34 formed in the end thereof. Check valves 101*a* and 103*a* are in communication with pump 51*a*, while check valves 101*b* and 103*b* are in communication with pump 51*b*.

When swash plate 48*a* is in the forward position, one of ports 71*a* or 73*a* will be under high pressure and the other port will be under low pressure, or vacuum. When swash plate 48*a* is moved to the neutral position, neither port will be under pressure, and when the direction of swash plate 48*a* changes (e.g., from forward to reverse) the status of ports 71*a* and 73*a* will switch, with the formerly low pressure or vacuum side being placed under high pressure, and vice versa. The ends of each system ports 71*a*, 71*b*, 73*a*, and 73*b* are threaded to permit connection of hoses 70 and 72 and the like.

As shown in FIG. 6, an external oil reservoir 86 may be mounted at various locations on vehicle 12 or on pump apparatus 10. Oil drains from pump chamber 50 through case drain 38, and then through outlet hose 91*b* to reservoir 86. Oil returns to the system through inlet hose 91*a*, passing through filter 92 into charge pump inlets 75*a* and 75*b*. As shown in FIG. 5, case drain 38 is located in housing 20 in a location corresponding to pump chamber 50, so that oil will drain from chamber 50 to reservoir 86 and will be passed through filter 92 before its return to the system. Filter 92 could also be located on hose 91*b*. Referring to FIG. 7, passages 80 and 81 are formed in end cap 30 and connected to charge inlets 75*a* and 75*b*. The location of passages 80 and 81 between system ports 71*a* and 73*a* allows for a compact end cap 30.

Bearing 96*a*, which is preferably a standard friction bearing, is used not only to support input shaft 25 but also to divide passage 80 into two separate sides, where inlet 75*a* and kidney 93*a*, which supplies oil from reservoir 86 to charge pump 57*a*, are on one side thereof, and passage 94*a*, which provides pressurized oil from charge pump 57*a* to charge gallery 95*a*, is on the other side. A similar bearing 96*b* is also used to support second shaft 26.

As noted above, pump chamber 50 and gear chamber 45 can be strictly segregated, such that the hydraulic oil used in pumps 51*a* and 51*b* is independent of the lubricant for spur gears 52*a*, 52*b* and 52*c*. This segregation would permit the use of a gear lubricant in gear chamber 45, which may be desirable in certain applications. It should be obvious to those with skill in the art that the foregoing arrangement may be varied without departing from the scope of the present invention.

Figure 9:
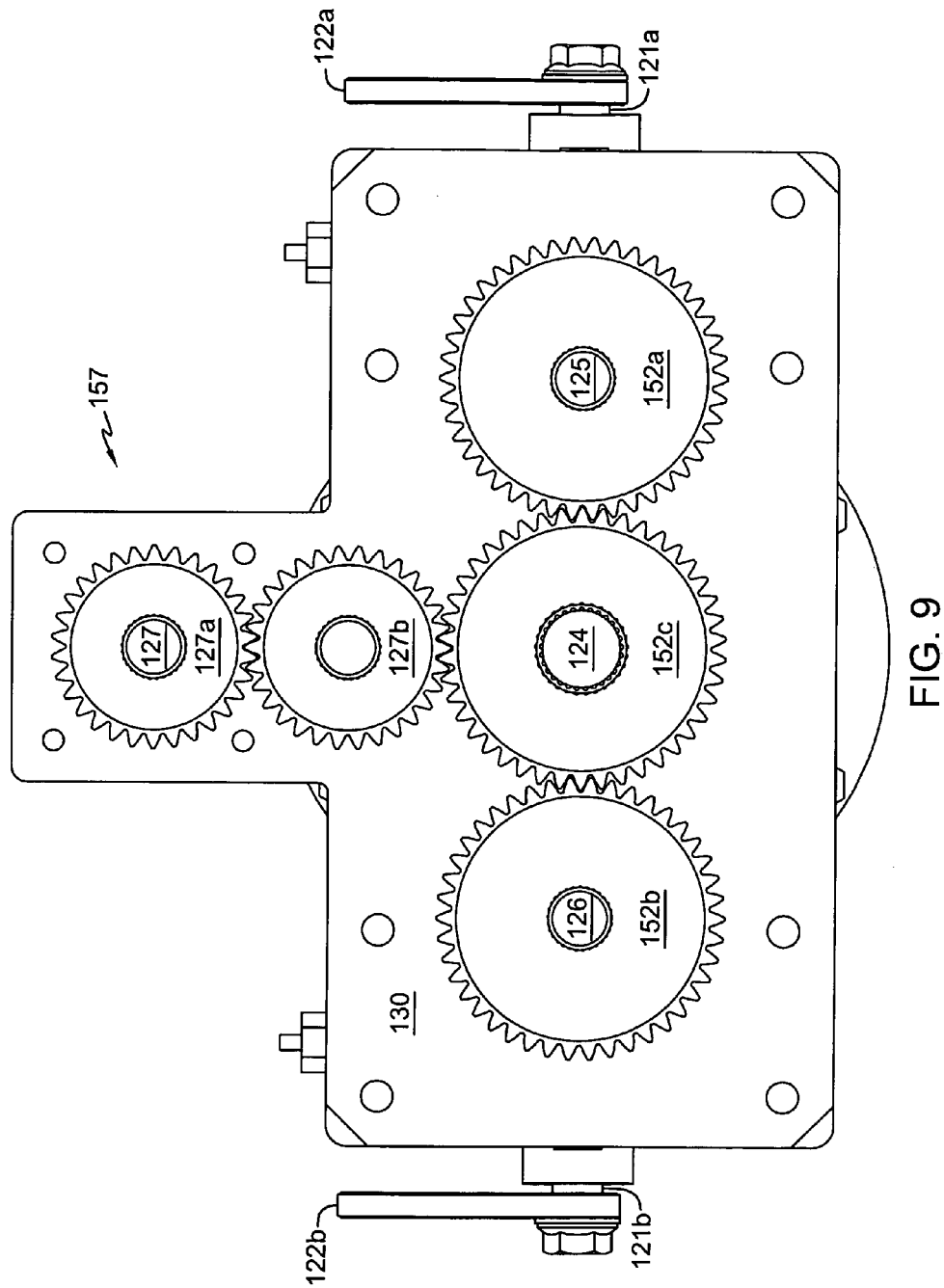
FIG. 9 is an end view of a second embodiment of this invention with the PTO and gear chamber cover removed.
Figure 10:
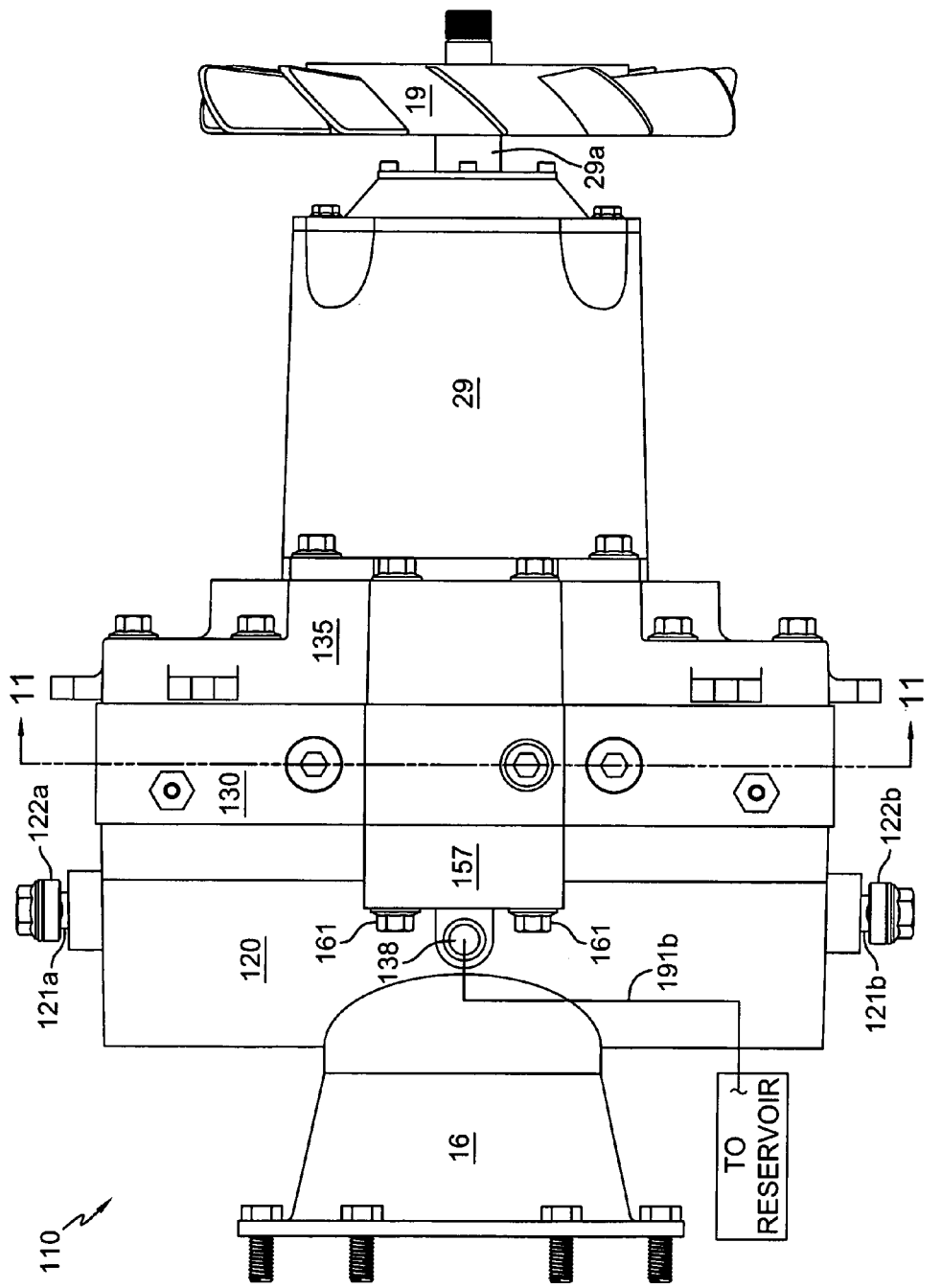
FIG. 10 is a top view of the dual pump and auxiliary pump design shown in FIG. 9.
Figure 11:
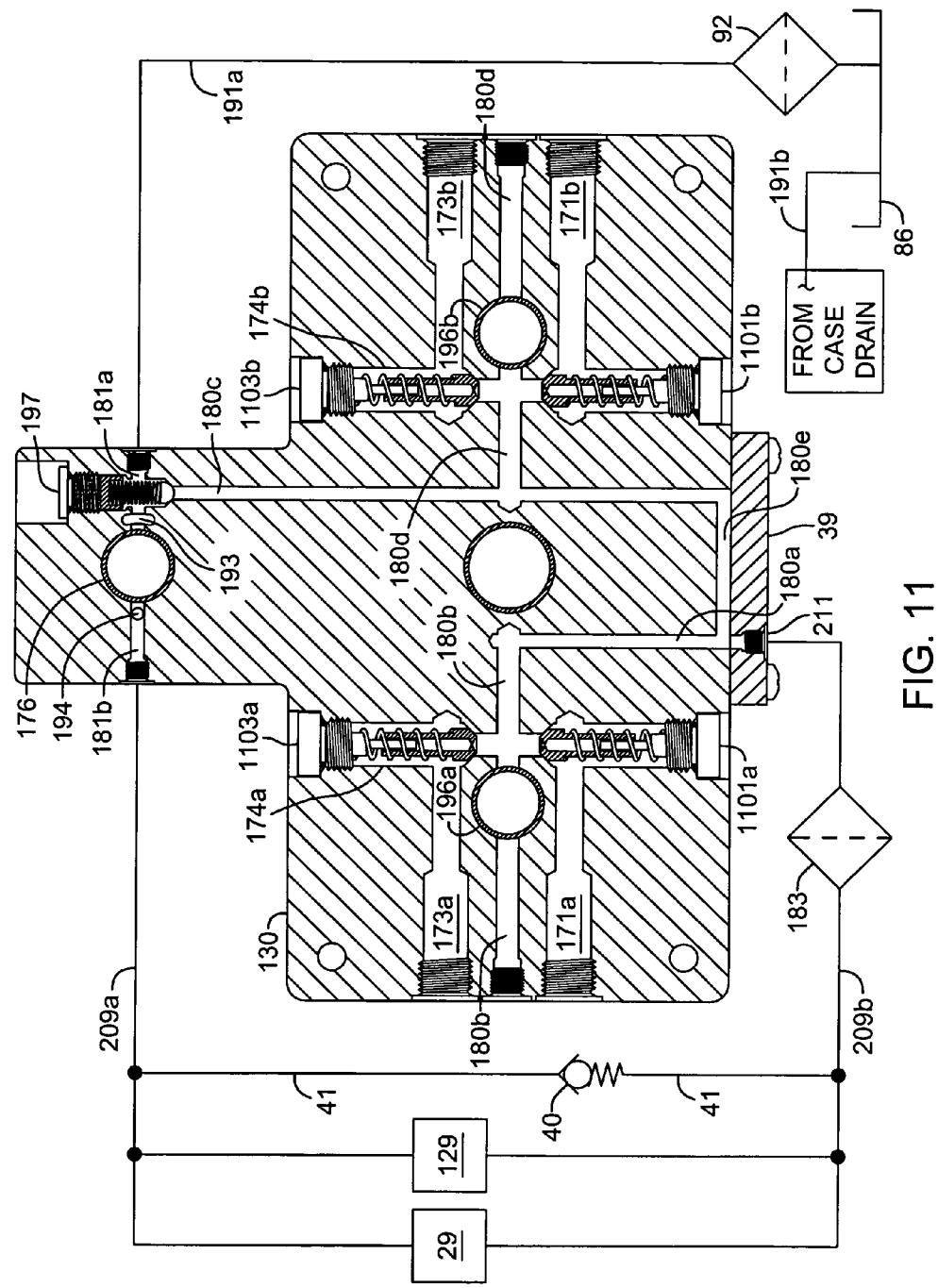
FIG. 11 is a cross sectional view of the end cap for the embodiment shown in FIG. 10, along lines 11-11, with certain system elements shown schematically.

A further embodiment of the present invention is shown in FIGS. 9-11. In this embodiment of pump apparatus 110, an auxiliary pump 157 has been provided in place of charge pumps 57*a* and 57*b* and auxiliary pump 157 may provide pressure for PTO 29. As shown in FIGS. 9 and 10, auxiliary pump 157 may be positioned above main drive shaft 124 and input shafts 125, 126 and attached to end cap housing 130 by fasteners 161. The orientation of swash plates 48*a* and 48*b* and the location of trunnion arms 121*a* and 121*b*, control arms 122*a* and 122*b* and output system ports 171*a*, 171*b*, 173*a* and 173*b* can remain generally the same as in the previous embodiment, as exemplified in FIG. 11. As shown in FIG. 9, main drive shaft 124 may be drivingly engaged to pump shafts 125, 126 and auxiliary pump shaft 127. For driving auxiliary pump shaft 127, main drive shaft 124 may be coupled to gear 152*c*, which transfers the driving force from main input shaft 124 to gear 127*b*, then to gear 127*a* and then to auxiliary pump shaft 127. It should also be obvious to those with skill in the art that auxiliary pump 157 may also be positioned below gear 152*c* or may be positioned above or below shaft 125 or 126. However, the position shown is advantageous as it allows shafts 125 and 126 to be sized for the load of the pumps they drive and only shaft 124 carries the torque for more than one pump.

As shown in FIG. 10, trunnion arms 121*a* and 122*b* extend from opposite ends of housing 120. The addition of auxiliary pump 157 requires a different end cap 130. FIG. 11 shows a cross-section of end cap 130, taken along the lines 11-11 in FIG. 10. In this embodiment, system ports 173*a* and 171*a* correspond to pump 51*a*, and ports 171*b* and 173*b* correspond to pump 51*b*.

The charge and auxiliary pump configuration of this embodiment is different from that of pump apparatus 10, which does not include an auxiliary pump. Fluid is drawn from reservoir 86 through filter 92 into charge inlet line 191*a*, which is connected to charge inlet passage 181*a*. Passage 181*a* is a portion of passage 181 that is formed through end cap 130 and then separated into charge inlet passage 181*a* and charge outlet passage 181*b* by the insertion of bearing 176.

As is known in the industry, fluid is then drawn from charge inlet passage 181*a* through charge inlet kidney 193 by auxiliary pump 157, which then provides pressurized fluid through outlet passage 194 into auxiliary outlet 181*b*. Auxiliary pump 157 may be a gerotor type pump or similar pump. From auxiliary outlet 181*b* pressurized fluid travels through auxiliary line 209*a* to PTO 29 or to another hydraulic auxiliary device 129, which may be a deck lift for deck 89, hydraulic actuators for moving swash plates 48*a* and 48*b*, or other hydraulically operated devices. Fluid may return from auxiliary device 129 or PTO 29 by way of auxiliary return line 209*b*. The returned fluid passes through filter 183 and re-enters end cap 130 through auxiliary return inlet port 211 formed in auxiliary cap 39. Although the foregoing description discusses utilizing auxiliary pump 157 to supply pressurized fluid to PTO 29, it should also be apparent that pumps 51*a* and 51*b* may also include charge pumps to serve this function.

Properly sized auxiliary pump 157 will provide more fluid than is necessary to operate auxiliary device 129. To allow the excess fluid to escape the auxiliary circuit, an auxiliary relief valve 40 is provided in auxiliary relief line 41 that is connected between outlet 181b of auxiliary pump 157 and auxiliary return inlet port 211. A person of skill in the art will understand that the location of auxiliary relief valve 40 shown is exemplary, as valve 40 may be located in a variety of locations, including passages formed internal to end cap 130. Filter 183 may similarly by located in a variety of locations, including internal to end cap 130, and in some configurations, filter 183 may not be required.

After entry through auxiliary return inlet 211, the fluid then enters a charge fluid gallery comprising gallery 180e, two passages 180a and 180c extending into end cap 130, and passages 180b and 180d formed at right angles to passages 180a and 180c. Passages 180b and 180d are machined or formed in end cap 130 and each is then divided into two portions by bearings 196a and 196b, respectively, and the openings to passages 180b and 180d at the surface of end cap 130 are plugged. Gallery 180e is preferably formed on a side of end cap 130 and closed off by auxiliary cap 39.

Pumps 51a and 51b may not require all the fluid available and a charge relief valve 197 is provided to limit the pressure in passages 180a, 180b, 180c, 180d and 180e. As shown, this relieved fluid returns to inlet 181a of auxiliary pump 157. However, for additional cooling the relieved fluid may be returned to reservoir 86.

As shown in FIGS. 10 and 11, any fluid that escapes into the internal sump of housing 120 is returned to reservoir 86 through case drain 138 and case drain line 191b.

System ports 173a and 173b are also formed at a generally right angle to intersect with check plug ports 174a and 174b, respectively, for ease of manufacture. This design permits the insertion of check plugs 1101a, 1101b and 1103a, 1103b into end cap 130 in the manner shown. This arrangement keeps check plugs 1101a, 1101b and 1103a, 1103b away from the fluid flow between pumps 51a and 51b and system ports 171a and 173b, and 171b and 173b, respectively. Being positioned between pumps 51a and 51b and system ports 171 and 173 would tend to reduce efficiency of pump apparatus 110. Having all of the required elements located in the same plane also decreases the required thickness of end cap 130.

This arrangement permits pump apparatus 110 to be mounted on vehicle frame 88 so that the axes of pumps 51a and 51b are parallel to the longitudinal axis of the vehicle. This design permits main drive shaft 124 to be directly driven by engine 84. This design eliminates the need for a separate belt and pulley, which decreases costs and increases the efficiency of the unit. Reservoir 86 may be secured to pump apparatus 110 or to vehicle frame 88 by a variety of known fastening mechanisms.

In this design, control arms 122a and 122b are mounted on the sides of housing 120 with respect to vehicle frame 88, which may increase the ease of connection with the various linkage mechanisms 69, depending on the structure of vehicle 12. As shown in FIG. 1, this arrangement also simplifies the connection of hydraulic hoses 70 and 72 from system ports 171a, 171b, 173a and 173b to motors 90.

Figure 12:
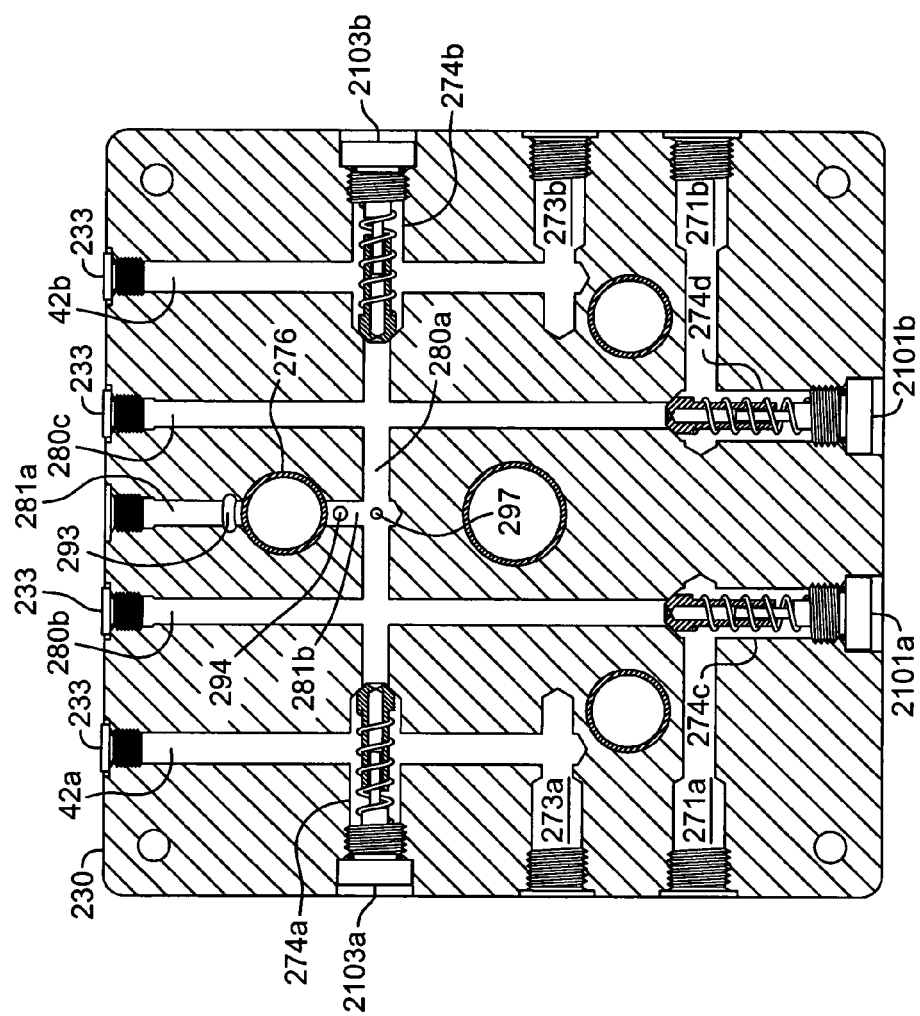
FIG. 12 is a cross-sectional view of an alternative end cap design for the embodiment shown in FIG. 11.

FIG. 12 shows a cross-section of another embodiment of this invention, where end cap 230 is similar in many ways to end cap 130 of FIG. 11. In this embodiment, a single charge pump (not shown) provides fluid to pumps 51a and 51b. System ports 271a and 273a correspond to pump 51a, and ports 271b and 273b correspond to pump 51b. The orientation of swash plates 48a, 48b and the location of trunnion arms 21a and 21b, control arms 22a and 22b and output system ports 271a, 271b, 273a and 273b would remain similar to that of the first two embodiments.

Fluid enters the charge pump from reservoir 86 through charge inlet 281a. From inlet 281a fluid passes through kidney-shaped opening 293 into the charge pump. The charge pump forces fluid through passage 294 into passage 281b, which is also the entry into charge gallery 280. Passages 281a and 281b are formed in a single operation and then separated by the insertion of bearing 276 into its bore. For convenience the opening to charge relief 297 is located in passage 281b, though it may be located at any position where it may communicated with charge gallery 280. Charge gallery 280 is formed by passage 280a extending between check plug 2103a positioned in port 274a and check plug 2103b positioned in port 274b, and passages 280b and 280c are formed at right angles to passage 280a and parallel with check plug 2101a positioned in port 274c and check plug 2101b positioned in port 274d. Passages 280b and 280c are then closed by plugs 233. Check plug 2103a is connected to system port 273a by connecting passage 42a. Similarly, check plug 2103b is connected to system port 273b by connecting passage 42b. Connecting passages 42a and 42b are closed at the edge of end cap 230 by plugs 233.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

The invention claimed is:

1. A hydraulic pump unit for mounting on a frame of a vehicle, the pump unit comprising:
   an end cap having a first side, a second side and porting formed within the end cap;
   a pump housing attached to the first side of the end cap, the pump housing including a pump chamber formed therein;
   a gear chamber cover attached to the second side of the end cap and forming a gear chamber therein;
   first and second hydraulic pumps rotatably mounted in the pump chamber, the hydraulic pumps being mounted on the first side of the end cap and driven by respective pump shafts;
   an auxiliary pump mounted to the first side of the end cap, and in fluid communication with the first and second hydraulic pumps, and being driven by an auxiliary shaft;
   a gear set mounted in the gear chamber and drivingly engaged to each of the pump shafts and the auxiliary shaft; and
   a main drive shaft drivingly engaged to the gear set, where the pump shafts and auxiliary shaft are driven by the main drive shaft and where the main drive shaft has a first end extending from the pump housing and directly coupled to a prime mover.

2. A hydraulic pump unit as set forth in claim 1, further comprising a power take off unit having an output shaft, the power take off unit being mounted to the gear chamber cover and the output shaft being drivingly and removably coupled to the main drive shaft.

3. A hydraulic pump unit as set forth in claim 2, wherein one of the pumps provides control pressure for the power take off unit.

4. A hydraulic pump unit as set forth in claim 2, wherein the auxiliary pump provides control pressure for the power take off unit.

5. A hydraulic pump unit as set forth in claim 2, further comprising a clutch for engaging and disengaging the output shaft to the main drive shaft.

6. A hydraulic pump unit as set forth in claim 2, further comprising a fan mounted on the output shaft.

7. A pump apparatus, the pump apparatus comprising:
a main input shaft engaged to and driving a drive mechanism;
a first pump having a first pump shaft driven by the drive mechanism;
a second pump having a second pump shaft driven by the drive mechanism;
an auxiliary pump having an auxiliary pump shaft driven by the mechanism; and
a common end cap defining porting and supporting the first pump, the second pump and the auxiliary pump;
wherein the auxiliary pump, first pump and second pump are disposed on a first side of the end cap and the auxiliary pump is in fluid communication with the first and second pumps, and the drive mechanism is located on a second side of the end cap opposite to the first side.

8. A pump apparatus as set forth in claim 7, wherein the pump apparatus is attached to a prime mover having a prime mover output, where the prime mover output and the main input shaft are coaxial.

9. A pump apparatus as set forth in claim 8, wherein the pump apparatus is attached to the prime mover by a bell housing.

10. A pump apparatus as set forth in claim 9, wherein the prime mover is connected to the main input shaft within the bell housing.

11. A pump apparatus as set forth in claim 8, wherein the prime mover output is a flywheel and the main input shaft is coupled to the flywheel.

12. A pump apparatus as set forth in claim 7, further comprising a pair of trunnion arms extending from opposite ends of the pump apparatus, where each trunnion arm is engaged to a swash plate located within the pump apparatus.

13. A pump apparatus as set forth in claim 7, further comprising a power take off unit with an output shaft and a clutch for engaging the output shaft to the main input shaft.

14. A pump apparatus as set forth in claim 13, wherein the output shaft and the main input shaft are coaxial.

15. A pump apparatus as set forth in claim 13, further comprising a fan mounted on the output shaft.

16. A pump apparatus as set forth in claim 7, wherein the first pump shaft and the second pump shaft are generally parallel to the main input shaft.

17. A pump apparatus attached to a prime mover, comprising:
a hydraulic mounting member having a first side and a second side opposite the first side;
a main input shaft having a first end connected to a prime mover output and a second end;
a first pump shaft driving a first pump;
a second pump shaft driving a second pump, the first pump shaft and the second pump shaft being drivingly coupled to and symmetrically located on opposite sides of the main input shaft;
the first and second pumps being rotatable disposed on the first side of the hydraulic mounting member;
an auxiliary pump shaft driving an auxiliary pump, the auxiliary pump shaft being drivingly coupled to the main input shaft and the auxiliary pump being in fluid communication with the first and second pumps; and
a power take off unit having a power take off shaft that is coaxial with the main input shaft, the power take off unit located on the second side of the hydraulic mounting member.

18. A pump apparatus as set forth in claim 17, further comprising a first trunnion arm to control the displacement of the first pump and a second trunnion arm to control the displacement of the second pump, wherein the first trunnion arm and the second trunnion arm each extend from opposite sides of the pump apparatus.

19. A pump apparatus as set forth in claim 18, wherein the hydraulic mounting member comprises a common end cap.

20. A pump apparatus as set forth in claim 19, wherein the auxiliary pump is supported on the first side of the common end cap.

21. A pump apparatus unit as set forth in claim 17, further comprising a separate housing member disposed between the hydraulic mounting member and the power take off unit, wherein the power take off unit is mounted to the separate housing member.

22. A pump apparatus unit as set forth in claim 21, further comprising a set of gears disposed within the separate housing member and powered by the second end of the input shaft and providing motive force to the first and second pumps and the auxiliary pump.

23. A hydraulic pump unit for mounting on a frame of a vehicle having a prime mover, the pump unit comprising:
a pump housing having a first end, a second end and a plurality of sides, and a pump chamber formed therein;
an end cap mounted on the second end of the pump housing;
a gear chamber cover attached to the end cap and forming a gear chamber therein;
first and second hydraulic pumps rotatably mounted in the pump chamber and driven by respective pump shafts;
an auxiliary pump mounted on the end cap and driven by an auxiliary shaft;
a gear set mounted in the gear chamber and drivingly engaged to each of the pump shafts and the auxiliary shaft;
a main drive shaft drivingly engaged to the gear set, whereby the pump shafts and auxiliary shaft are driven by the main drive shaft, the main drive shaft having a first end extending from the first end of the pump housing and being directly coupled to the prime mover, and a second end extending from the gear chamber cover; and
a power take off unit mounted to the gear chamber cover and including an output shaft, the power take off unit being drivingly coupled to the main drive shaft and the output shaft being coaxial with the main drive shaft.

24. A hydraulic pump unit as set forth in claim 23, wherein one of the pumps provides control pressure for the power take off unit.

25. A hydraulic pump unit as set forth in claim 23, wherein the auxiliary pump provides control pressure for the power take off unit.

26. A hydraulic pump unit as set forth in claim 23, further comprising a clutch for engaging and disengaging the output shaft of the power take off unit to the main drive shaft.

27. A hydraulic pump unit as set forth in claim 23, further comprising a fan mounted on an end of the output shaft.

* * * * *

UNITED STATES PATENT AND TRADEMARK OFFICE
CERTIFICATE OF CORRECTION

PATENT NO. : 7,377,105 B1
APPLICATION NO. : 10/987681
DATED : May 27, 2008
INVENTOR(S) : Raymond Hauser It is certified that error appears in the above-identified patent and that said Letters Patent is hereby corrected as shown below:

Claim 7, Column 9, Line 14 delete "the mechansim" and replace with --the drive mechanism--.

Claim 17, Column 9, Line 60 delete "rotatable" and replace with --rotatably--.

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,377,105 B1  Page 1 of 1
APPLICATION NO. : 10/987681
DATED : May 27, 2008
INVENTOR(S) : Hauser It is certified that error appears in the above-identified patent and that said Letters Patent is hereby corrected as shown below:

Title Page, Item (75) Inventors, delete "Hauser Raymond" and replace with --Raymond Hauser--.

Signed and Sealed this

Second Day of February, 2010

David J. Kappos
*Director of the United States Patent and Trademark Office*